United States Patent [19]
Diderich

[11] Patent Number: 6,095,219
[45] Date of Patent: Aug. 1, 2000

[54] METHOD FOR SPLITTING UP A HONEYCOMB PANEL, THUS OBTAINED SEPARATOR AND SEPARATOR FOR ABRASIVE PLATES

[75] Inventor: Johannes P. L. M. Diderich, Ermelo, Netherlands

[73] Assignee: Bresin B.V., Ermelo, Netherlands

[21] Appl. No.: 08/913,921

[22] PCT Filed: Mar. 22, 1996

[86] PCT No.: PCT/NL96/00123

§ 371 Date: Nov. 17, 1997

§ 102(e) Date: Nov. 17, 1997

[87] PCT Pub. No.: WO96/30211

PCT Pub. Date: Oct. 3, 1996

[30] Foreign Application Priority Data

Mar. 24, 1995 [NL] Netherlands ............................ 9500573

[51] Int. Cl.⁷ .................................................. B32B 31/00
[52] U.S. Cl. ........................... 156/510; 156/197; 156/257; 493/340; 493/354; 493/355; 493/966; 428/72; 428/76; 428/116
[58] Field of Search ............................... 428/116, 73, 118, 428/117, 74, 76, 67, 72; 493/340, 355, 354, 402, 347, 966; 156/257, 510, 197; 83/407; 425/289

[56] References Cited

U.S. PATENT DOCUMENTS 1,805,735   5/1931  Kurtz .
2,731,379   1/1956  Wheeler ................................... 154/124
3,481,813  12/1969  Wiggers ................................... 156/211
3,611,882  10/1971  Anderson .................................. 93/1 G
3,890,108   6/1975  Welsh ..................................... 29/191.4
3,959,056   5/1976  Caplan .................................... 156/197
4,194,313   3/1980  Downing .................................. 40/610
4,675,241   6/1987  Hull ....................................... 428/116
5,269,422  12/1993  Chevrette ................................ 206/448
5,683,781  11/1997  Komarek et al. ........................ 428/116
5,690,601  11/1997  Cummings et al. ..................... 493/340
5,804,030   9/1998  Jaegers et al. .......................... 156/510
5,913,766   6/1999  Reed et al. .............................. 493/464
5,950,835   9/1999  Moser et al. ............................ 206/586

FOREIGN PATENT DOCUMENTS

WO93/16868  9/1993  European Pat. Off. .
   205295    4/1992  Hungary .
  9316868    2/1993  WIPO .

Primary Examiner—Deborah Jones
Assistant Examiner—Abraham Bahta
Attorney, Agent, or Firm—Ladas & Parry

[57] ABSTRACT

A method for splitting up a honeycomb panel, preferably for use as a separator for sheets and, particularly, breakable sheets such as glass sheets, starts with a sheet of honeycomb material with a cover layer on both sides. During the splitting up, each cover layer is cut from outside of the honeycomb toward the inside in order to flange the cover layer in situ to the inside.

20 Claims, 1 Drawing Sheet

METHOD FOR SPLITTING UP A HONEYCOMB PANEL, THUS OBTAINED SEPARATOR AND SEPARATOR FOR ABRASIVE PLATES

BACKGROUND OF THE INVENTION

The invention relates to a method for splitting up a honeycomb panel, which comprises a sheet of honeycomb material with a cover layer on both sides. The invention also relates to a thus obtained separator and to a separator for abrasive sheets.

Pieces of honeycomb panel are useful for many purposes and are, for instance, used in the form of separators in the glass sheet industry.

When producing sheets of glass the glass leaves the glass melting furnace as a continuous band, which is cut into sheets, after which the sheets are placed upright against each other. The sheets are, for example, 3 meters high and 6 meters wide. In order to transport a number of sheets simultaneously, a separator is disposed every 8 to 10 sheets, so that there is a gap between each set of glass sheets. Known separators are approximately 25 mm in thickness. The known separators are made of paper honeycomb material with a cardboard cover layer on both sides in order to obtain sufficient strength without weight and costs being high.

The separators are automatically laid on a sheet of glass after it has been cut off, but prior to placing upright. To prevent the separators from sliding, they are provided at one end with a thickening, called a nose in the trade, which hooks behind the upper edge of the glass sheet when placing it in an upright position. Because there is still the risk that when handling the sheet of glass a separator will shift and/or fall to the ground, the result being that the production process is disturbed, the separator can be provided with connecting means such as one or more suction cups. During automatic placing of the separator, it is arranged on the sheet of glass with some pressure, in order to detachably adhere to the sheet of glass. A nose on the separator is then not always necessary.

With separators without connecting means both cover layers of the separator naturally come into contact with the sheets of glass, but also with a separator with suction cups, which are for the greater part sunk in the separator, the suction cups are pressed in so far that the cover layer of the side in which they are arranged also comes into contact with the sheet of glass.

It is a disadvantage with the known separator that when removing the separator from the sheet of glass again after is use, the edges of the separators in most cases leave traces of paper or glue of the honeycomb material, the cover layer or the glue with which these parts were glued together, on the sheet of glass. This is brought about because the honeycomb panel from which the separators are made is split up by sawing or by cutting it into strips, When sawing with a straight knife with a serrated cutting edge an up and down movement is made, as a result of which a frayed edge is formed on the separator, which leaves traces on the sheet of glass. When cutting, a rotating circular knife is pulled through the sheet of honeycomb material which pushes the cover layer somewhat outward on the side where it leaves the sheet, as a result of which this edge easily leaves traces on the sheet of glass. The presence of traces on a sheet of glass is undesirable if the sheet of glass has to, for example, undergo a surface treatment or has to be processed into panes of double glazing.

SUMMARY OF THE INVENTION

It is an object of the invention to prevent a separator from leaving traces on sheets, in particular sheets of glass.

In accordance with a first aspect of the invention for that purpose a method is provided as set forth in the opening paragraph, in which during the splitting up each cover layer is cut from the outside of the honeycomb panel to the inside in order to flange the cover layer in situ to the inside.

Because the cutting edges of the cover layers of the pieces of honeycomb material are flanged to the inside, these cutting edges remain at a distance from the sheet against which a piece of honeycomb panel is subsequently placed. In that way, the glue on the cutting edge and the loose fibres which are formed there during cutting do not come into contact with the surface of the sheet, and will therefore leave no traces on the surface of the sheet.

DESCRIPTION OF PREFERRED EMBODIMENTS

Preferably the honeycomb panel is cut in that two knives simultaneously cut the panel each from one side, so that each knife cuts through a part of the thickness of the honeycomb panel and flanges the cover layer on its side towards the inside.

Preferably the panel is in that case cut by two rotating circular knives, so that the cutting edges of the pieces of honeycomb panel are flanged for certain towards the inside over their entire length.

Figure 1:
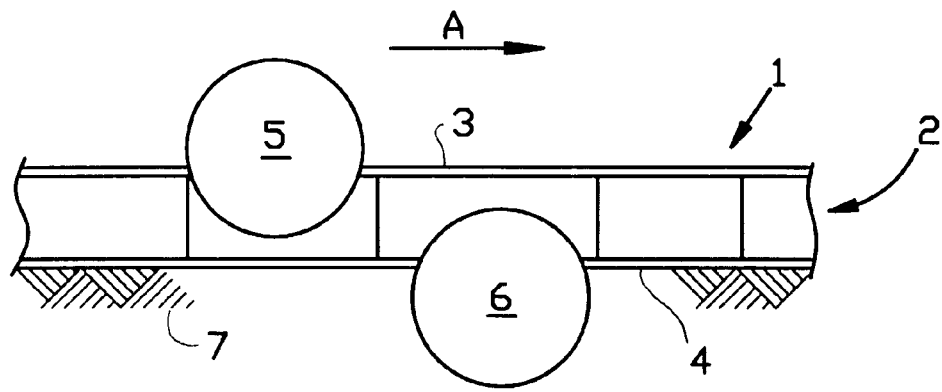
FIG. 1 is a schematic transverse cross-sectional elevation of a panel along line I—I in FIG. 2.

More specifically, as shown in FIG. 1, a honeycomb panel 1 is composed of a core 2 of honeycomb-shaped cells, an upper cover sheet 3 and a lower cover sheet 4.

Figure 2:
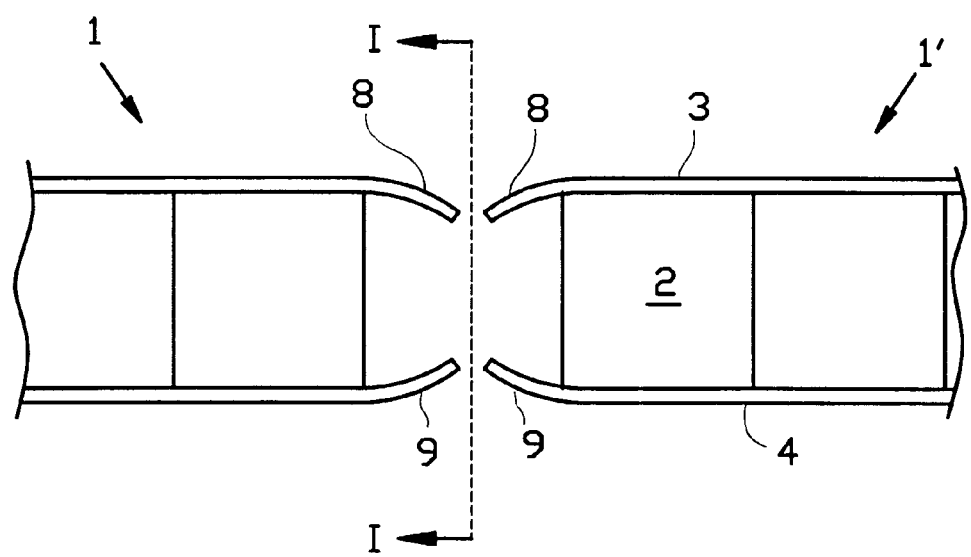
FIG. 2 is a schematic longitudinal cross-sectional elevation of the panel of FIG. 1. the subtitle.

A portion of the panel 1 is to be cut off into panel part 1' (FIG. 2), which is realized by placing the panel 1 on a base 7 and relatively passing the panel in the direction A along an upper circular rotating cutting blade (knife) 5 and a lower circular rotating cutting blade (knife) 6. The lowest portion of the upper blade 5 is at a lower level than the top portion of the lower blade 6. During cutting the upper cover sheet 3 is cut from above and the lower cover sheet 4 is cut from below. As a result, the cut edges 8 and 9 (FIG. 2), of the upper cover sheet 3 and the lower cover sheet 4 are flanged downwardly and upwardly, respectively, i.e. into or towards the core 2.

In accordance with a second aspect of the invention a separator for sheets is provided, in particular for breakable sheets such as sheets of glass, comprising a strip of honeycomb material which is provided on both sides with a cover layer and made according to the method described above, in which the cutting edges of the cover layers of the separator are flanged towards the inside.

In this way a separator in particular for the glass sheet industry is provided, with the help of which the leaving of traces on one or both of the sheets of glass between which it is placed can be avoided, because of the effect of the flanged cutting edges of the cover layers set out above.

According to an advantageous embodiment of this separator the cover layers are provided with a coating which leaves no traces on the surface of an abrasive sheet.

On the smooth surface of an ordinary sheet of glass the unbroken surface of the cover layer of a separator will not leave any traces. There are abrasive sheets, however, such as reflective sheets of glass, which have a rough or structured surface. If a separator is placed on such a surface and slides to some degree, the rough surface will loosen paper or cardboard fibres from the cover layer. When removing the separator traces will then be left behind on the sheet of glass.

For that reason according to a third aspect of the invention a separator for abrasive sheets, in particular reflective sheets of glass, is provided, comprising a strip of honeycomb material which is provided on both sides with a paper cover layer, the paper cover layer being provided with a coating which leaves no traces on the rough, structured surface of the sheet. The coating ensures that the rough surface cannot loosen fibres from the paper cover layer.

The coating is preferably a polymer coating, in view of the fact that such a coating is cheap and can easily be applied.

The polymer coating is preferably a polythene coating with a high molecular density, preferably more than 950 $kg/m^3$, seeing as this material has a high tensile strength and a high breaking strain and is therefore very tough, so that the rough surface of an abrasive sheet cannot loosen particles from the coating, which remain behind as traces on the sheet.

Preferably the method of the first aspect of the invention is used during the production of these separators so that the cutting edges of the paper cover layers do not come into contact with an abrasive sheet.

What is claimed is:

1. Method for splitting up a honeycomb panel, which comprises a sheet of honeycomb material with a cover layer on both sides, wherein each cover layer is cut from the outside of the honeycomb panel to the inside in order to flange the cover layer in situ to the inside.

2. Method according to claim 1, wherein the honeycomb panel is cut by two knives simultaneously cutting the panel each from one side.

3. Method according to claim 2, wherein the panel is cut by two rotating circular knives.

4. Separator for sheets, comprising a strip of honeycomb material which is provided on both sides with a cover layer made according to the method of claim 1, wherein cover layer edges resulting from the cutting of the cover layers of the separator are flanged towards the inside.

5. Separator according to claim 4, wherein the cover layers are provided with a coating which does not leave any traces on the surface of an abrasive sheet.

6. Separator according to claim 4, wherein the sheets are abrasive sheets with rough, structured surfaces, the cover layer is paper, and the paper cover layer is provided with a coating which leaves no traces on the rough, structured surfaces of the sheets.

7. Separator according to claim 6, wherein the coating is a polymer coating.

8. Separator according to claim 7, wherein the polymer coating is polyethylene with a high molecular density.

9. Separator according to claim 8, wherein the polyethylene has a density of more than 950 $kg/m^3$.

10. Separator for abrasive sheets each having a rough, structured surface, comprising a strip of honeycomb material which is provided on both sides with a paper cover layer, wherein the paper cover layer is provided with a coating which leaves no traces on the rough, structured surface.

11. Separator according to claim 10, wherein the coating is a polymer coating.

12. Separator according to claim 11, wherein the polymer coating is a polyethylene with a high molecular density.

13. Separator according to claim 12, wherein the polyethylene has a density of more than 950 $kg/m^3$.

14. Separator according to claim 10, wherein the separator is made using the method for splitting up a honeycomb panel, which comprises a sheet of honeycomb material with a cover layer on both sides, characterized in that during the splitting up each cover layer is cut from the outside of the honeycomb panel to the inside in order to flange the cover layer in situ to the inside.

15. Separator according to claim 4, wherein the sheets are breakable.

16. Separator according to claim 15, wherein the breakable sheets are glass.

17. Separator according to claim 6, wherein the sheets are reflective glass.

18. Separator according to claim 10, wherein the sheets are reflective glass.

19. Separator according to claim 18, wherein the coating is a polymer coating.

20. Separator according to claim 19, wherein the polymer coating is polyethylene with a high molecular density.

* * * * *

UNITED STATES PATENT AND TRADEMARK OFFICE
CERTIFICATE OF CORRECTION

PATENT NO. : 6,095,219
DATED : August 1, 2000
INVENTOR(S) : Johannes P.L.M. Diderich It is certified that error appears in the above-identified patent and that said Letters Patent is hereby corrected as shown below:

Title page, item [73],"Bresin" should read --Besin--.

Signed and Sealed this

Twenty-fourth Day of October, 2000

Attest:

Q. TODD DICKINSON

*Attesting Officer*  *Director of Patents and Trademarks*